United States Patent
Greenberg et al.

(10) Patent No.: US 11,347,384 B2
(45) Date of Patent: *May 31, 2022

(54) HORTICULTURAL CARE TRACKING, VALIDATION AND VERIFICATION

(71) Applicant: iUNU, Inc., Seattle, WA (US)

(72) Inventors: Adam Phillip Takla Greenberg, Seattle, WA (US); Matthew Charles King, Seattle, WA (US)

(73) Assignee: iUNU, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/859,891

(22) Filed: Apr. 27, 2020

(65) Prior Publication Data

US 2020/0264759 A1    Aug. 20, 2020

Related U.S. Application Data

(63) Continuation of application No. 15/271,630, filed on Sep. 21, 2016, now Pat. No. 10,635,274, which is a
(Continued)

(51) Int. Cl.
*G06F 3/0484* (2013.01)
*G06T 11/20* (2006.01)
(Continued)

(52) U.S. Cl.
CPC ......... *G06F 3/04842* (2013.01); *A01G 22/00* (2018.02); *G06F 3/03547* (2013.01);
(Continued)

(58) Field of Classification Search
None
See application file for complete search history.

(56) References Cited

U.S. PATENT DOCUMENTS

| 5,841,883 A | 11/1998 | Kono et al. |
| 7,013,284 B2 | 3/2006 | Guyan et al. |

(Continued)

FOREIGN PATENT DOCUMENTS

| EP | 2736318 A1 | 6/2014 |
| JP | 2011103870 A | 6/2011 |

(Continued)

OTHER PUBLICATIONS

Non-Final Office Action for U.S. Appl. No. 15/271,569, dated Jan. 23, 2018, 33 pages.
(Continued)

*Primary Examiner* — Jeffrey J Chow
(74) *Attorney, Agent, or Firm* — Han Santos, PLLC

(57) ABSTRACT

Techniques for collecting information about plants on a per plant or near per plant basis and promulgating remedial courses of action are disclosed. A horticultural operation receives plant information such as a plurality of images corresponding to a plurality of plants respectively, wherein at least one of the received plurality of images is an image of interest containing an identified plant, an identified artifact, and is associated with an identified issue of the identified plant corresponding to the identified artifact. The image of interest is displayed to workers in the horticultural operation along with the identified issue of the identified plant corresponding to the identified artifact.

20 Claims, 8 Drawing Sheets

Related U.S. Application Data continuation-in-part of application No. 15/271,569, filed on Sep. 21, 2016, now Pat. No. 10,339,380.

(51) Int. Cl.

| | | |
|---|---|---|
| *G06T 11/60* | (2006.01) | |
| *A01G 22/00* | (2018.01) | |
| *G06F 16/583* | (2019.01) | |
| *G06F 3/0488* | (2013.01) | |
| *G06F 3/0481* | (2013.01) | |
| *G06F 3/0354* | (2013.01) | |
| *G06K 9/00* | (2006.01) | |
| *G06F 40/169* | (2020.01) | |
| *G06F 3/04842* | (2022.01) | |
| *G06F 3/04817* | (2022.01) | |
| *G06F 3/04883* | (2022.01) | |
| *G06V 20/10* | (2022.01) | |

(52) U.S. Cl.
CPC ........ *G06F 3/0484* (2013.01); *G06F 3/04817* (2013.01); *G06F 3/04883* (2013.01); *G06F 16/5854* (2019.01); *G06T 11/206* (2013.01); *G06T 11/60* (2013.01); *G06F 40/169* (2020.01); *G06V 20/188* (2022.01)

(56) References Cited

U.S. PATENT DOCUMENTS

| | | | |
|---|---|---|---|
| 7,184,846 | B2 | 2/2007 | Albright et al. |
| 7,711,576 | B1 | 5/2010 | Duett et al. |
| 8,145,330 | B2 | 3/2012 | Emoto |
| 8,249,926 | B2 | 8/2012 | Avey et al. |
| 8,594,375 | B1 | 11/2013 | Padwick |
| 8,613,158 | B2 | 12/2013 | Conrad |
| 8,850,742 | B2 | 10/2014 | Dubé |
| 9,565,812 | B2 | 2/2017 | Wilson |
| 9,603,316 | B1 | 3/2017 | Mansey et al. |
| 9,779,442 | B1 | 10/2017 | Cimic et al. |
| 10,002,375 | B1 | 6/2018 | Scythes et al. |
| 2003/0227487 | A1 | 12/2003 | Hugh |
| 2004/0231240 | A1 | 11/2004 | Kuiper et al. |
| 2005/0072862 | A1 | 4/2005 | Skinner |
| 2006/0196116 | A1 | 9/2006 | Zettl |
| 2007/0065857 | A1 | 3/2007 | Glaser et al. |
| 2007/0179854 | A1 | 8/2007 | Ziv et al. |
| 2007/0289207 | A1 | 12/2007 | May et al. |
| 2008/0066072 | A1 | 3/2008 | Yurekli et al. |
| 2009/0005247 | A1 | 1/2009 | Spiegel et al. |
| 2009/0112789 | A1 | 4/2009 | Oliveira et al. |
| 2009/0132543 | A1 | 5/2009 | Chatley et al. |
| 2009/0144284 | A1 | 6/2009 | Chatley et al. |
| 2009/0164741 | A1 | 6/2009 | Takaki |
| 2010/0305966 | A1 | 12/2010 | Coulter et al. |
| 2011/0090960 | A1 | 4/2011 | Leontaris et al. |
| 2011/0137757 | A1 | 6/2011 | Paolini et al. |
| 2011/0196710 | A1 | 8/2011 | Rao |
| 2012/0003728 | A1 | 1/2012 | Lanoue et al. |
| 2012/0109387 | A1 | 5/2012 | Martin et al. |
| 2012/0249741 | A1 | 10/2012 | Maciocci et al. |
| 2013/0006401 | A1 | 1/2013 | Shan |
| 2013/0185108 | A1 | 7/2013 | Bainbridge et al. |
| 2013/0191836 | A1 | 7/2013 | Meyer |
| 2013/0235183 | A1 | 9/2013 | Redden |
| 2013/0332205 | A1 | 12/2013 | Friedberg et al. |
| 2014/0026474 | A1 | 1/2014 | Kulas |
| 2014/0035752 | A1 | 2/2014 | Johnson |
| 2014/0115958 | A1 | 5/2014 | Helene et al. |
| 2014/0154729 | A1 | 6/2014 | Leyns et al. |
| 2014/0168412 | A1 | 6/2014 | Shulman et al. |
| 2014/0176688 | A1 | 6/2014 | Ibamoto |
| 2014/0200690 | A1 | 7/2014 | Kumar |
| 2014/0288850 | A1 | 9/2014 | Avigdor et al. |
| 2014/0324490 | A1 | 10/2014 | Gurin |
| 2015/0015697 | A1 | 1/2015 | Redden et al. |
| 2015/0026092 | A1 | 1/2015 | Abboud et al. |
| 2015/0120349 | A1 | 4/2015 | Weiss |
| 2015/0131867 | A1 | 5/2015 | Lin et al. |
| 2015/0185995 | A1* | 7/2015 | Shoemaker ........... G06F 3/0484 715/708 |
| 2015/0227707 | A1 | 8/2015 | Laws et al. |
| 2015/0230409 | A1 | 8/2015 | Nicole et al. |
| 2015/0261803 | A1 | 9/2015 | Song et al. |
| 2015/0286897 | A1 | 10/2015 | Spaith |
| 2015/0295877 | A1 | 10/2015 | Roman |
| 2016/0026940 | A1 | 1/2016 | Johnson |
| 2016/0050840 | A1 | 2/2016 | Sauder et al. |
| 2016/0050862 | A1 | 2/2016 | Walliser |
| 2016/0086032 | A1 | 3/2016 | Pickett |
| 2016/0127599 | A1 | 5/2016 | Medicherla et al. |
| 2016/0140868 | A1 | 5/2016 | Lovett et al. |
| 2016/0148104 | A1 | 5/2016 | Itzhaky et al. |
| 2016/0205872 | A1 | 7/2016 | Chan et al. |
| 2016/0216245 | A1* | 7/2016 | Sutton ................ G06K 9/00664 |
| 2016/0239709 | A1 | 8/2016 | Shriver |
| 2016/0278300 | A1 | 9/2016 | Clendinning et al. |
| 2016/0345517 | A1 | 12/2016 | Cohen et al. |
| 2017/0030877 | A1* | 2/2017 | Miresmailli ........... A01G 25/16 |
| 2017/0038749 | A1 | 2/2017 | Mewes et al. |
| 2017/0039657 | A1 | 2/2017 | Honda et al. |
| 2017/0064912 | A1 | 3/2017 | Tabakman |
| 2017/0068924 | A1 | 3/2017 | Tanaka et al. |
| 2017/0250751 | A1 | 8/2017 | Kargieman et al. |
| 2017/0286772 | A1* | 10/2017 | Workman ............... H04L 67/10 |
| 2017/0300846 | A1 | 10/2017 | Harwood |
| 2017/0374323 | A1 | 12/2017 | Gornik |
| 2018/0039261 | A1* | 2/2018 | Haller ................ G05B 23/0221 |
| 2018/0041545 | A1 | 2/2018 | Chakra et al. |
| 2018/0052637 | A1 | 2/2018 | Chen |
| 2018/0276504 | A1* | 9/2018 | Yamaguchi .......... G06K 9/3241 |
| 2018/0325051 | A1 | 11/2018 | Brandao et al. |
| 2019/0034736 | A1 | 1/2019 | Bisberg et al. |
| 2019/0212316 | A1 | 7/2019 | Sutton |

FOREIGN PATENT DOCUMENTS

| | | |
|---|---|---|
| KR | 20130005540 A | 1/2013 |
| KR | 20140077513 A | 6/2014 |
| KR | 20140114089 A | 9/2014 |
| KR | 20150000435 A | 1/2015 |
| KR | 20150000435 U | 1/2015 |
| WO | 2011115666 A2 | 9/2011 |
| WO | 2014100502 A1 | 6/2014 |

OTHER PUBLICATIONS

European Patent Application No. 17853932.6, Extended European Search Report dated Feb. 21, 2020, 12 pages.

European Patent Application No. 17853934.2, Extended European Search Report dated Dec. 13, 2019, 10 pages.

International Application No. PCT/US2019/013927, International Search Report and Written Opinion dated May 7, 2019, 9 pages.

International Search Report and Written Opinion for PCT Application No. PCT/US2017/052800 dated Jan. 16, 2018, 14 pages.

International Search Report and Written Opinion for PCT Application No. PCT/US2017/052805 dated Jan. 9, 2018, 14 pages.

Jean et al. AR Plants: Herbal Plant Mobile Application utilizing Augmented Reality. Dec. 2017. [retrieved on Apr. 1, 2019]. Retrieved from the Internet:<URL:http://delivery.acm.org/10.1145/3170000/3168426/>. entire document.

Marco Augustin et al., "A framework for the extration of quantitative traits from 2D images of mature *Arabidopsis thaliana*", Oct. 16, 2015 (https://link.springer.ocm/article/10.1007/s00138-015-0720-z) See abstract; and sections 3-4.

Markus Funk et al: "Interactive worker assistance", Pervasive and Ubiquitous Computing, ACM, 2 Penn Plaza, Suite 701 New York NY 10121-0701 USA, Sep. 12, 2016 (Sep. 12, 2016), pp. 934-939, XP058279126, DOI: 10.1145/2971648.2971706 ISBN: 978-1-4503-4461-6.

(56) References Cited

OTHER PUBLICATIONS

Oing Yao et al: "Application of Support 1-15 Vector Machine for Detecting Rice Diseases Using Shape and Color Texture Features", Engineering Computation, 2009. ICEC 109. International Conference On, IEEE, Piscataway, NJ, USA, May 2, 2009 (May 2, 2009), pp. 79-83, XP031491490.ISBN: 978-0-7695-3655-2 * the whole document*.
S. Nagasai, et al., 'Plant Disease Identification using Segmentation Techniques', In: International Journal of Advanced Research in Computer and Communication Engineering, Oct. 5, 2015, vol. 4, Issue 9, ISSN (Online) 2278-1021 (https://www.ijarcce.com/upload/2015/september-15/?C=N;O=A).
Sagar Patil et al.: "A Survey on Methods of Plant Disease Detection", International Journal of Science and Research, vo 1.4, No. 2, Feb. 1, 2015 (Feb. 1, 2015).
Sanjeev S. Sannakki et al., "Comparison of Difference Leaf Edge Detection Algorithms Using Fuzzy Mathematical Morphology," International Journal of Innovations in Engineering and Technology (IJIET), 2012, vol. 1, Issue 2, ISSN: 2319-1058.
Shah Jitesh P et al.: "A survey on detection and classification of rice plant diseases", 2016 IEEE International Conference on Current Trends in Advanced Computing (ICCTAC), IEEE, Mar. 10, 2016 (Mar. 10, 2016), pp. 1-8, XP032960803, DOI: 10.1109/ICCTAC.2016.7567333 [retrieved on Sep. 13, 2016] *abstract* *Sec.VII* * Sec. V * * figure.
U.S. Appl. No. 15/271,658, Final Office Action dated Jul. 29, 2019, 31 pages.
U.S. Appl. No. 15/271,630, Final Office Action dated Apr. 17, 2019, 11 pages.
U.S. Appl. No. 15/271,630, Non-Final Office Action dated Sep. 26, 2018, 18 pages.
U.S. Appl. No. 15/271,630, Notice of Allowance, dated Jan. 15, 2020, 18 pages.
U.S. Appl. No. 15/271,630, Notice of Allowance, dated Nov. 20, 2019, 22 pages.
U.S. Appl. No. 15/271,658, Non Final Office Action dated Jan. 8, 2020, 36 pages.
U.S. Appl. No. 15/271,658, Non-Final Office Action dated Sep. 19, 2018, 8 pages.
U.S. Appl. No. 15/271,727, Final Office Action dated Apr. 25, 2019, 36 pages.
U.S. Appl. No. 15/271,727, Non-Final Office Action dated Oct. 2, 2018, 22 pages.
U.S. Appl. No. 15/271,749, Non Final Office Action dated Oct. 16, 2019, 58 pages.
U.S. Appl. No. 15/891,110, Final Office Action dated Dec. 17, 2018, 13 pages.
U.S. Appl. No. 15/891,110, Non Final Office Action dated Oct. 24, 2019, 32 pages.
Vaglica, "Shrub Pruning Dos and Donts", Aug. 3, 2016, https://www.thisoldhouse.com/ideas/shrub-pruning-dos-and-donts (Year: 2016).
U.S. Appl. No. 15/271,658, Notice of Allowance dated May 5, 2020, 47 pages.
U.S. Appl. No. 15/891,110, Final Office Action dated May 1, 2020, 31 pages.
U.S. Appl. No. 15/271,749, Office Action dated Sep. 11, 2020, 63 pages.
European Patent Application No. 17853934.2, Office Action dated Nov. 11, 2020, 7 pages.
U.S. Appl. No. 15/271,727, Final Office Action dated Nov. 2, 2020, 36 pages.
Canadian Patent Application No. 3,089,725 Office Acton dated Aug. 18, 2021, 5 pages.
S. Nagasai, S. Jhansi Rani, Plant Disease Identification using Segmentation Techniques, Sep. 2015, International Journal of Advanced Research in Computer and Communication Engineering, vol. 4, Issue 9, pp. 411-413. (Year: 2015).
U.S. Appl. No. 15/271,727, Notice of Allowance dated Aug. 13, 2021, 130 pages.
U.S. Appl. No. 15/271,749, Final Office Action dated Jun. 30, 2021, 86 pages.
U.S. Appl. No. 15/271,749, Notice of Allowance dated Mar. 23, 2022, 214 pages.
U.S. Appl. No. 15/271,749, Notice of Allowance dated Feb. 24, 2022, 139 pages.
U.S. Appl. No. 16/998,925, Notice of Allowance dated Apr. 5, 2022, 83 pages.

* cited by examiner

600

602 — Receive a plurality of images corresponding to a plurality of plants including a first image of interest and a second image of interest 604 — User Interface choice Toggling Chart 606 — Receive a user interface gesture to toggle the displaying of the first image of interest 610 — Display a chart over time of at least one parameter of the identified plant 612 — Receive a user interface gesture selection on the displayed chart wherein the second image of interest corresponds to the time represented by the selection on the displayed chart 608 — Display the second image of interest responsive to the receiving of the user interface gesture

Figure 6

HORTICULTURAL CARE TRACKING, VALIDATION AND VERIFICATION

RELATED APPLICATIONS

This application is a continuation application of U.S. Utility patent application Ser. No. 15/271,630, filed on Sep. 21, 2016, entitled, "Horticultural Care Tracking, Validation and Verification," which is a continuation-in-part application of U.S. Utility patent application Ser. No. 15/271,569, filed on Sep. 21, 2016, entitled, "Hi-Fidelity Computer Object Recognition Driven Horticultural Feedback Loop," which are hereby incorporated herein in their entirety by this reference.

BACKGROUND

A horticultural operation generally includes planting, cultivation and the harvesting of plants. Large scale horticultural operations may include multiple grow operations in multiple locations with staff with widely varying capabilities. A master grower, responsible for a large scale horticultural operation, is faced with many challenges to collect actionable information about plants and grow operations in his or her care, to identify issues, to identify remedial courses of action, and to dispatch those courses of action to workers. In other words, a master grower is responsible for implementing and executing a horticultural feedback loop— the monitoring and remediation of a horticultural operation.

One challenge is to collect and share information in a timely and effective fashion. Present operations are generally manual, inconsistent, and slow to collect let alone aggregate in a fashion conducive for developing a remedial course of action. Even if a course of action is developed, dispatching those course of actions to workers with widely differing capabilities present additional challenges.

Central to the concept of a feedback loop, including a horticultural feedback loop, is the ability to not only track remedial courses of action but also to verify that a course of action has been properly performed and to determine the efficacy of that course of action. Accordingly, there are many challenges to implement a true horticultural operation feedback loop.

BRIEF DESCRIPTION OF THE DRAWINGS

The Detailed Description is set forth with reference to the accompanying figures.

FIG. 6 is a flow chart of an exemplary display patterns of multiple images during horticultural care tracking.

DETAILED DESCRIPTION

Context of Horticultural Care Tracking, Validation and Verification

Overview

Figure 1:
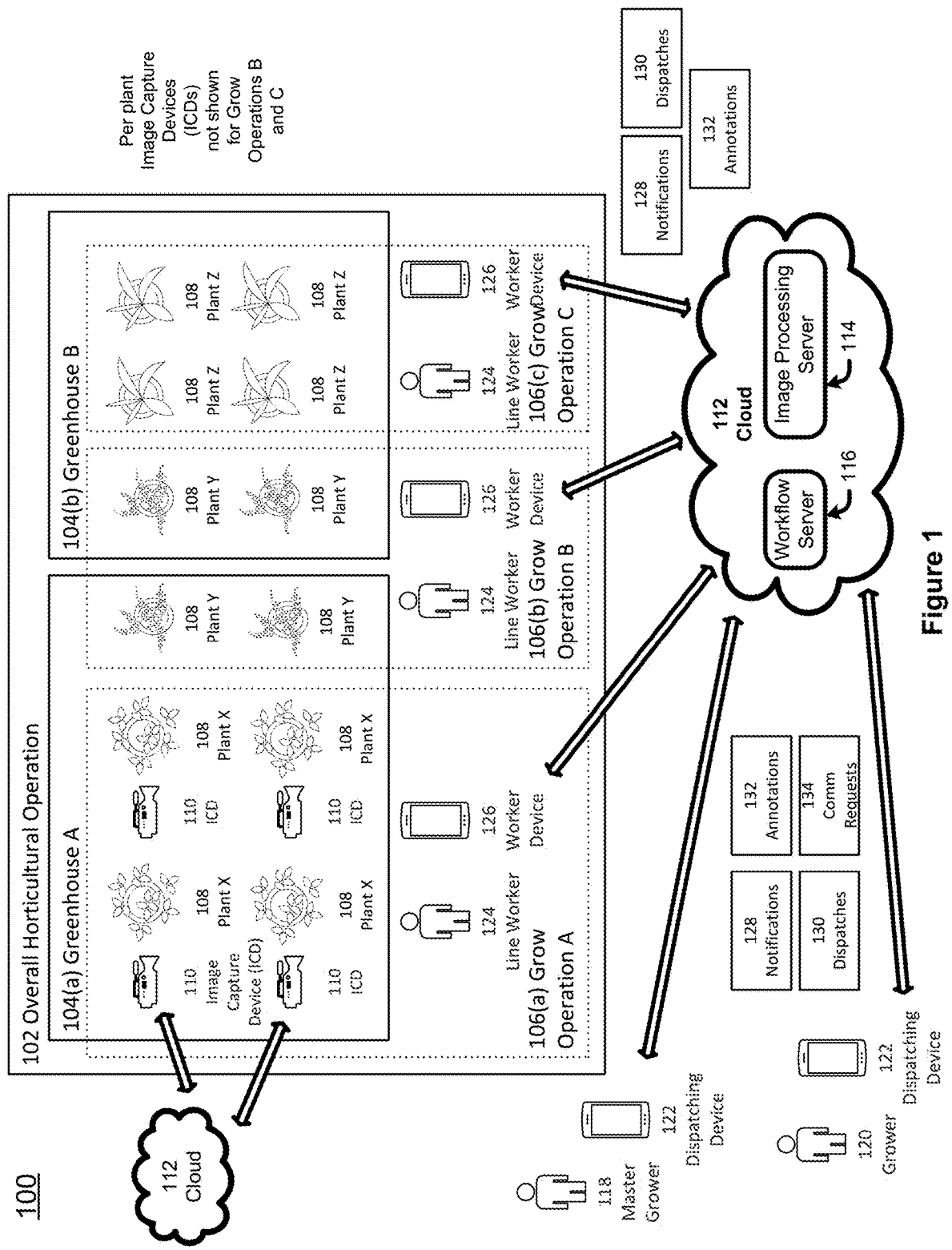
FIG. 1 is a top level context diagram for horticultural care tracking, validation and verification.

Modern horticultural operations are potentially far flung and heterogeneous operations. FIG. 1, is a context diagram 100 of an exemplary horticultural operation 102 instrumentation for automated informational and operational feedback. With this instrumentation and other disclosed infrastructure, horticultural care tracking, validation and verification is enabled.

A horticultural operation 102 may have several locations. For example, there may be several greenhouses illustrated as greenhouse A 104(*a*) and greenhouse B 104(*b*). Note that the greenhouses need not be physically proximate to each other. In fact, the greenhouses may be many miles away. They are related in that they are under the responsibility of the horticultural operation 102. For example, they may be owned by the same company. Also note that greenhouses 104 need not actually be greenhouses, but may also be a location where plants are grown, for example an open field or a hydroponic operation.

A greenhouse 104 may have multiple grow operations 106(*a*), 106(*b*) and 106(*c*). Although grow operations 106 are generally in the same location, a grow operation 106 may be a logical construct. For example, in the FIG. 1, grow operation A 106(*a*) is sited entirely within greenhouse A 104(*a*) and grow operation C 106(*c*) is sited entirely within greenhouse B 104(*b*). However, grow operation B 106(*b*) is partially sited within greenhouse A 104(*a*) and partially sited within greenhouse B 104(*b*). For example, grow operation B 106(*b*) may be a special set of plants grown under the same purchase order, and accordingly a company may seek to track those plants together under the same grow operation 106.

Each grow operation 106, may have one or more plants 108 under care. As shown in FIG. 1, three types of plants 108 are illustrated, plant X, plant Y and plant Z. Notwithstanding FIG. 1, A grow operation 106 comprise only one type of plant or alternatively multiple types of plants.

As part of instrumentation, each plant 108, or substantially each plant 108 may have its own image capture device 110 (abbreviated "ICD" in FIG. 1). An image capture device may be a digital video camera or alternatively a digital still camera configured to capture images periodically. Each image capture device 110 has the capability of uploading captured images either directly to a server, for example in the internet/cloud 112, or via an intermediate server (not shown). The image capture device 110 may be part of a larger suite of sensors (not shown) networked to a data capture function (not shown) which upload plant, telemetry, media and other data to an image processing server 114 in the internet/cloud 112. A workflow server 116 handles the coordination of information to different servers and users. The image capture device 110, internet/cloud 112, image processing server 114, workflow server 116, data capture function, and suite of sensors are described in further detail with respect to FIG. 2.

Once plant, telemetry, media and other data from the image capture devices 110 and other sensors are uploaded to the image processing server 114, the information may be analyzed. After analysis, the images, other images, and results of the analysis may be made available via the workflow server 116, to administrative personnel including a master grower 118, responsible for the entire horticultural operation 102, or a grower 120, responsible for a subset of the grow operations 106 and reporting to the master grower. Administrative personnel 118 and 120 generally are responsible for reviewing the state of plants within the horticultural operation 102, identifying issues and directing remedial courses of action to address those identified issues.

To aid administrative personnel 118 and 120, the image processing server 114 may perform image analysis to automatically detect issues in plants. Alternatively, the workflow server 116 make plant images available to administrative personnel 118 and 120 on demand. Information is provided from the workflow server 116 to administrative personnel 118 and 120 via a dispatching device 122. The dispatching device 122 is generally a mobile device and is described in further detail with respect to FIG. 2.

Additionally, line workers 124 may also have worker devices 126. The workflow server 116 provides telemetry, media, and other information such as workflow information to the line workers 124 via the worker devices 126. The worker device 126 is generally a mobile device and is described in further detail with respect to FIG. 2.

In one embodiment of workflow, the workflow server 116 provides telemetry, media and other information to a dispatching device 122. Information may be a notification 128. Notifications 128 generally are small messages that indicate that there is an issue, or that an event has occurred. A notification 128 may include related telemetry and/or media. Provision of related telemetry and/or media is described in further detail with respect to FIG. 4.

An administrative person 118 and 120 may then review the telemetry, media and other information on the dispatching device 122. In some cases notification 128 is an indication of an issue in a plant, as determined by analysis performed by the image processing server 114. In other cases, an issue is identified by an administrative person 118 and 120 reviewing telemetry, media and other information on the dispatching device 122. Upon the administrative person 118 and 120 selecting or specifying a remedial course of action to address the identified issue, the dispatching device 122 sends a dispatch 130 to the workflow server 116 to instruct a line worker 124 as selected by the workflow server 116, to perform the remedial course of action.

The notifications 128 may be made to a line worker 124 via an iconographic language. In some cases, line workers 124 may have a different primary language than the administrative personnel 118 and 120 or may have different educational levels. By using an iconographic language for dispatches, the iconographic language provides *lingua franca* to effectively bridge any language and/or educational divides. The iconographic language is described in further detail with respect to FIG. 7.

The dispatch 130 is then forwarded to the line worker 124 via the line worker's worker device 126. The line worker 124 then performs the course of action in the dispatch 130 and may send a notification 128 indicating completion. In some cases, the line worker 124 may also provide some annotations 132 to associate with the notification 128 indicating completion, which the workflow server 116 may then make available to the administrative personnel 118 and 120 to review on a dispatching device 122.

In some cases, administrative personnel 118 and 120 may identify issues by reviewing telemetry, media and other information on the dispatching device 122. Before committing to a remedial course of action, an administrative person 118 and 120 may seek to collaborate with another administrative person 118 and 120. Accordingly, the dispatching devices 122 enable collaborative viewing, communication and commenting by remote administrative personnel 118 and 120. Collaborative viewing is described in further detail with respect to FIG. 4.

In this way, FIG. 1 illustrates an exemplary complete horticultural feedback loop, with integrated automated diagnoses and analysis, as well as independent analysis by administrative workers 118 and 120, and with communication with line workers 124 via an iconographic language.

Exemplary Hardware, Software and Communications Environment

Figure 2:
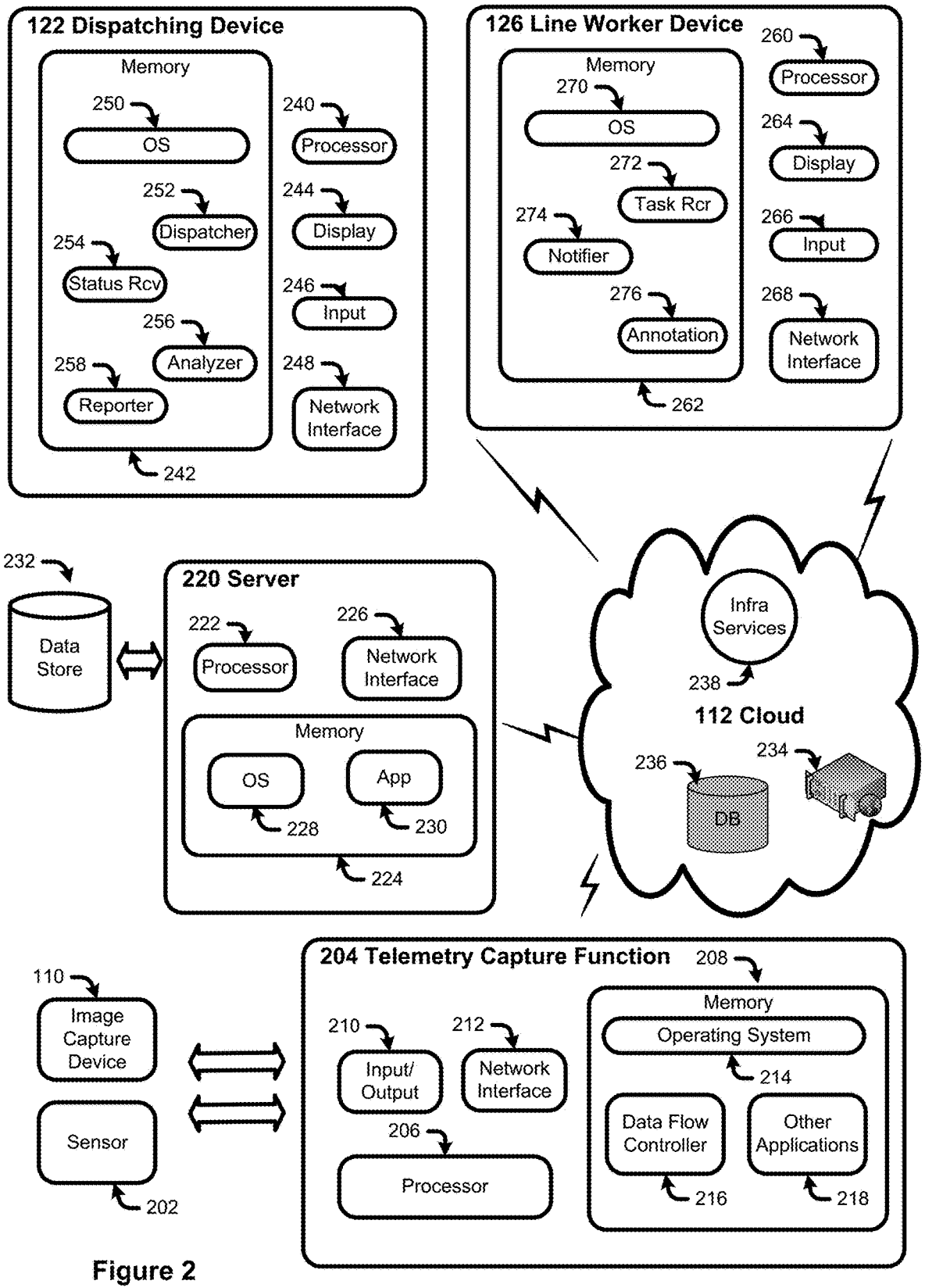
FIG. 2 is an architectural diagram of an exemplary hardware, software and communications environment for horticultural care tracking, validation and verification.

Prior to disclosing horticultural care tracking, validation and verification and related techniques, an exemplary hardware, software and communications environment is disclosed. FIG. 2 illustrates several possible embodiments of a hardware, software and communications environment 200 for horticultural care tracking, validation and verification related techniques.

Telemetry Capture

Images are captured via an image capture device 110. As described above, the image capture device 110 may be a digital video camera or a digital still camera configured to capture images periodically and/or on demand. Because of the automated nature of digital video and/or digital still cameras, it is possible to economically deploy image capture devices 110 on a per plant or substantially per plant basis.

Generally an image capture device 110 may take visible light spectra pictures, but may also extend to non-visible spectra such as infrared and ultraviolet. The image capture device 110 may have an on board application programming interface (API) enabling programmatic control. Alternatively the image capture device 110 may be networked thereby enabling remote control.

Not all telemetry collected is image based. In addition to an image capture device 110, sensors 202 may collect telemetry on a per plant or substantially per plant basis. Any sensor 202 that may be connected to a standard computer input/output interface (described below) may be added. Without limitation, sensors 202 may include light meters, water meters, potential of hydrogen (pH) acid/alkali meters, and the like.

Some telemetry from sensors 202 will be the sensor readings themselves. Some telemetry may be calculated from sensor 202 measurements. For example, a light meter may measure light intensity for that moment of time. However, an extrapolation calculation may estimate the daily light integral, which is the total light applied to a plant over a given time period (in this case a day).

Other telemetry from different sensors 202 may be combined. For example, a light meter may provide a measurement of the amount of light over time and an oxygen sensor may measure amount of 02 generated by a plant over time. From these two measurements, the photosynthetic efficiency measurements, such as the relative photosynthesis index may be calculated.

Telemetry from sensors 202 may be combined with outside information. For example, a sensor 202 providing telemetry for the amount of vapor in the air, may be combined with the water saturation point, to calculate the vapor pressure deficit. The vapor pressure deficit is the difference between the amount of water in the air and the amount of water the air can hold if saturated.

Control functions for telemetry capture may be in a separate telemetry capture function 204. The telemetry capture function 204 may incorporate the image capture device 110 and may be part of a larger integrated device, such as a lumiere feedback device. Indeed, the image capture function 204 may be part of a lumiere feedback device itself.

Hardware for Telemetry Capture Control Function

The telemetry capture control function 204 is generally hosted on a computing device. Exemplary computing devices include without limitation personal computers, laptops, embedded devices, tablet computers, smart phones, and virtual machines. In many cases, computing devices are to be networked.

The computing device for the telemetry capture control function 204 may have a processor 206 and a memory 208. The processor 206 may be a central processing unit, a repurposed graphical processing unit, and/or a dedicated controller such as a microcontroller. The computing device for the telemetry capture control function 204 may further include an input/output (I/O) interface 210, and/or a network interface 212. The I/O interface 210 may be any controller card, such as a universal asynchronous receiver/transmitter (UART) used in conjunction with a standard I/O interface protocol such as RS-232 and/or Universal Serial Bus (USB). The network interface 212, may potentially work in concert with the I/O interface 210 and may be a network interface card supporting Ethernet and/or Wi-Fi and/or any number of other physical and/or datalink protocols. Accordingly, sensors 202 may interface with the telemetry capture function 204 via a connected port, serial or parallel, and/or via networking.

Memory 208 is any computer-readable media which may store several software components including an operating system 214 and software components such as a data flow controller 216 and/or other applications 218. In general, a software component is a set of computer executable instructions stored together as a discrete whole. Examples of software components include binary executables such as static libraries, dynamically linked libraries, and executable programs. Other examples of software components include interpreted executables that are executed on a run time such as servlets, applets, p-Code binaries, and Java binaries. Software components may run in kernel mode and/or user mode.

Computer-readable media includes, at least, two types of computer-readable media, namely computer storage media and communications media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transmission mechanism. As defined herein, computer storage media does not include communication media.

Data Flow

The data flow controller 216 is a software component responsible for managing the capture of telemetry, receiving images from the image capture device 110 (if not integrated with the telemetry capture function 204) and sensor data streams from sensors 202, the local management of received images and data, and potentially the transmission of received images and data off the telemetry capture function 204 over a network.

Other applications 218 may be utilities to perform image and/or data processing, such as compression and/or encryption. Other utilities 218 may include functions to create data streams based on calculations from telemetry one or more sensors.

The data flow controller 216 may also manage the transmission of received images and data. Specifically, it may transmit an image or data to a known network location via the network interface 212. The known network locations may include a server 220 or an internet/cloud location 112.

Upon transmission, the telemetry flow controller 216 may enlist in notifications to determine that the transmission was successful. The telemetry flow controller 216 may also transmit notifications to other device subscribing to its notifications indicating status of a transmission.

Servers

The telemetry capture function 204 may communicate to a server 220. Example servers include the image processing server 114 and the workflow server 116. The server 220 is any computing device that may participate in a network. The network may be, without limitation, a local area network ("LAN"), a virtual private network ("VPN"), a cellular network, or the Internet. The server 220 is analogous to the host computer for the telemetry capture function 220 described above. Specifically, it will include a processor 222, a memory 224, and a network interface 224. In the memory will be an operating system 228 and software components 230 comprising applications. The server 220 may communicate with a data store 232 via a direct input/output connection via an input/output interface (not shown), or via a network connection. The data store 232 may be, without limitation, a file server itself, a network aware storage (NAS), or a database.

Two applications 230 on the server may be an image processing server 114, and a workflow server 116. An image processing server 114 is described in co-pending application Ser. No. 15/271,569, entitled "Hi Fidelity Computer Object Recognition Based Horticultural Feedback Loop," and is herein incorporated by reference. Workflow in the workflow server 116 is described in greater detail with respect to FIG. 4.

Dispatching Device

A dispatching device 122 is any computing device that can participate on a network. Generally a dispatching device 122 is a mobile device such as a laptop, a tablet computer and/or a cell phone. As with any computing device, a dispatching device 122 will have a processor 240 and a memory 242 with analogous characteristics to the host computer for the telemetry capture function 220 as described above. The dispatching device 122 may include a display 244 to display output and an input 246 to receive user input. In some embodiments, the display 244 and the input 246 may be integrated together, for example like a touch screen in a tablet computer or smart phone. Note also that a laptop may also have a touchscreen as well as a keyboard for input thereby providing multiple inputs 246. To participate on a network, the dispatching device 122 will have a network interface 248, analogous to the network interface 212 described above.

In the dispatching device 122 memory 242 is an operating system 250, and a number of application components to support dispatch device functions. Those components may include a dispatcher software component 252, a status receiver software component 254, an analyzer software component 256 and a reporter software component 258.

The dispatching device 122 provides the software for an administrative person 118 and 120 to initiate a feedback loop. Specifically, the dispatcher software component 252 is used to dispatch remedial courses of action, and the status receiver software component 254 is used to receive status updates on the dispatched remedial courses of action. The operation of the dispatcher software component 252 and the status receiver software component 254 is described in further detail with respect to FIG. 4.

The dispatching device 122 also provides the software for an administrative person 118 and 120 to analyze and diagnose potential issues in plants and horticultural operations in general. Accordingly, the analyzer software component 256 may facilitate analysis on images of interest, including performing static analysis and sequential analysis. The reporter software component 258 may report issues to bring to the attention of an administrative person 118 and 120. Such reporting may be in the form of providing queries on notifications and premade reports. Static analysis and sequential analysis are described in co-pending application Ser. No. 15/271,569, entitled "Hi Fidelity Computer Object Recognition Based Horticultural Feedback Loop," and is herein incorporated by reference. Analysis may also include review of images of interest described below with respect to FIG. 6. Example reporting is described in further detail below with respect to FIG. 8.

Line Worker Device

A line worker device 126 is any computing device that can participate on a network. Generally a dispatching device 126 is a mobile device such as a laptop, a tablet computer and/or a cell phone. As with any computing device, a dispatching device 126 will have a processor 260 and a memory 262 with analogous characteristics to the host computer for the telemetry capture function 220 as described above. The line worker device 126 may include a display 264 to display output and an input 266 to receive user input. In some embodiments, the display 264 and the input 266 may be integrated together, for example like a touch screen in a tablet computer or smart phone. Note also that a laptop may also have a touchscreen as well as a keyboard for input thereby providing multiple inputs 266. To participate on a network, the line worker device 126 will have a network interface 268, analogous to the network interface 212 described above.

In the line worker device 126 memory 262 is an operating system 272, and a number of application components to support line worker functions. Those components may include a task receiver software component 272, a notifier software component 274 and an annotation software component 274.

The line worker device 126 is to include software to enable line workers 242 to receive remedial course of action, and to provide feedback. The feedback is then sent via the line worker device 126 to the workflow server 116 for future distribution to administrative workers 118 and 120.

The task receiver software component 272 receives dispatches 130 from administrative personnel 118 and 120 and notifications 128 from the workflow server. Notifications 128 and dispatches 130 are then queued by the task receiver software component 272. The line worker indicates on the line worker device 126 when a task is complete, or otherwise provides status. The notifier software component 274 manages the transmission of task status to the workflow server 116. In some cases, the line worker may provide textual, image, and other information about the task. The line worker may annotate the task or alternatively an image of interest associated with a task with the annotation software component 276. Workflow for the line worker 124 and the line worker device 126 is described in further detail with respect to FIG. 7.

Image of Interest

Figure 3:
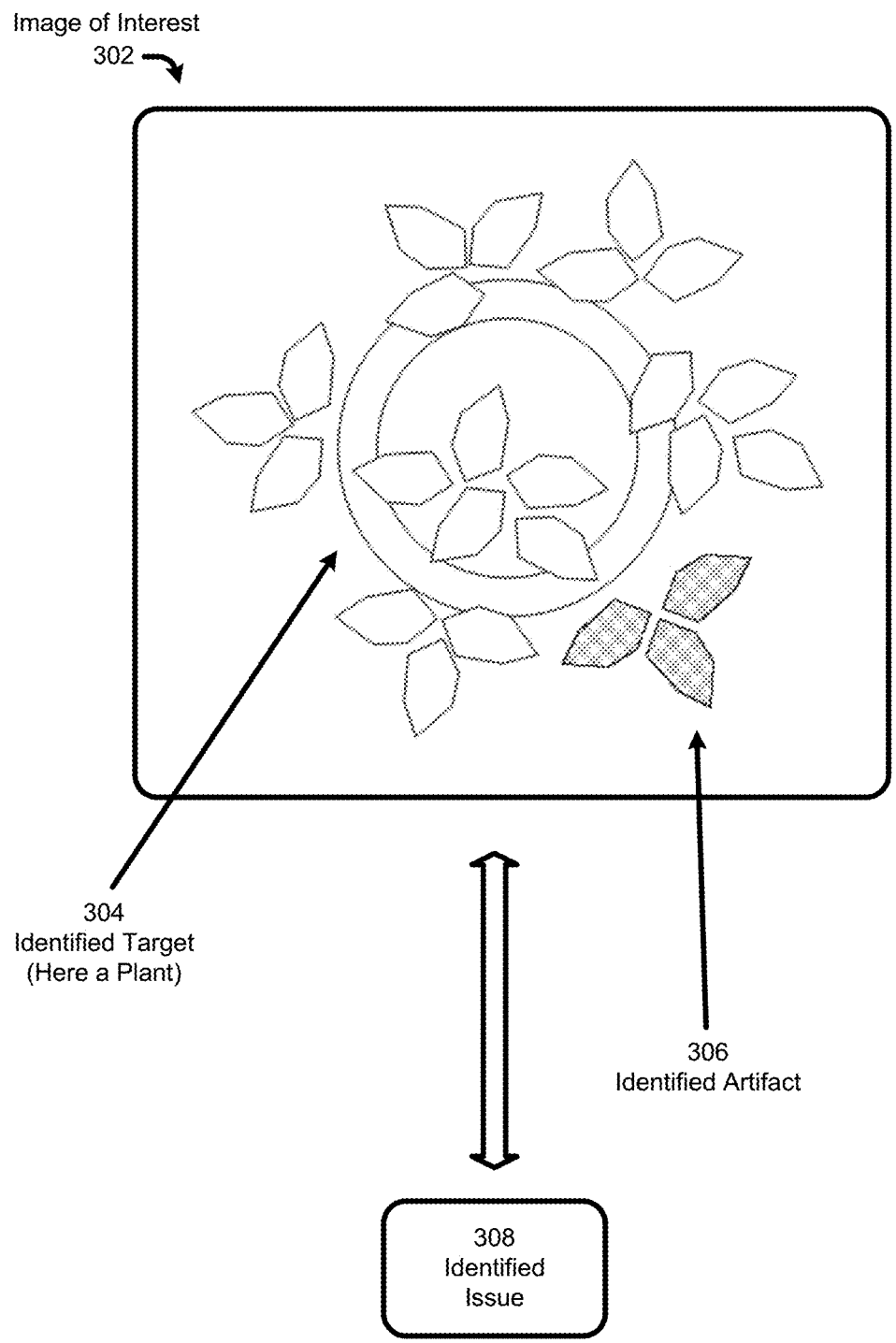
FIG. 3 is an exemplary image of interest for horticultural care tracking, validation and verification.

Prior to discussing the operational flow of horticultural care tracking validation and verification, it is useful to describe the notion of an image of interest. FIG. 3 is a diagram 300 of an image of interest 302. Specifically, an image of interest 302 is not merely an image, but is an image with an identified target 304 usually a plant, an identified artifact 306 of the target, and potentially associated with an identified issue record 308.

A target 304 in the image of interest 302 is the subject of the image. When an image 302 is captured by an image capture device 110, the image capture device 110 is targeting a real world object. The image 302 will have portions (e.g. pixels) capturing the subject of the image, and the image 302 will have portions capturing the background and/environment surrounding the subject of the image and other items that are not the subject of the image. The target 304 in the image of the interest 302 are the portions of the image 302 that capture the subject of the image.

When separating the target 304 in the image of interest 302 from the rest of the image, typically image segmentation techniques are applied by the workflow server 116 or other servers. Generally the portion of the image 302 relating to the target 304 will be subdivided into different image segments. Accordingly, in a horticultural operation, the plant/target 304 in an image 302 will itself be segmented. Generally each segment will correspond to a portion of the plant 304. For example, individual leaves, flower petals, stems and branches may be discerned from individual image segments. Each image segment corresponding to a feature in a target is an artifact. Accordingly, an image of interest 302 not only contains a target 304, but also can subdivide out artifacts 306, i.e. image segments corresponding to target features.

Images processed by the telemetry capture function 204 and the workflow server 116 in a horticultural information will almost always contain a target 304, generally a plant. What makes an image an image of interest 302 is that the image is a candidate for the workflow server 116 to bring to the interest of an administrative person 118 and 120 via a dispatching device 122. This is accomplished by making an image of interest 302 capable of association with an issue 308. Note that an image may be an image of interest 302, but will not yet have been associated with an issue. Rather an image of interest 302 will have the potential to be associated with an issue record 308 in a persistent fashion. This may be accomplished in several ways. Images 302 may be stored in a relational database in an image table and issue records 308 may be stored in an issue table. A cross-reference table relating images to issues would then store associations of images to issues. Alternatively, an image 302 may store a pointer to an issue record 308 as part of the image's container.

An issue record 308 is any representation, usually in text, that describes an anomaly in the target/plant 302. An issue record 308 may also include information about the likely severity of the issue, thereby aiding in ranking issues. An issue record may also include annotation information, provided by administrative personnel 118 and 120 and/or line workers 124. Alternatively, annotations may be stored separately, but associated with the image 302 and/or issue record 308. As with the issue record 308 itself, an association of an annotation may be via a cross-reference table or a pointer as described above.

The workflow server 116 may create an issue record 308 automatically by performing image processing on the image 302. Alternatively, an administrative person 118 and 120 may browse images 302 and create an issue record 308 via the dispatching device 122. When an issue record 308 is created, it is associated by the workflow server 116 with the image 302.

In addition to identifying issues, the workflow server 116 may also store a table of remediation courses of action associated with issues. In this way, where an issue record 308 is associated with an image 302, the issue record 308 may be used to query the workflow server for at least one remediation course of action.

Upon the association of an issue record 308 with an image 302, the workflow server 116 may send a notification 128 to the dispatching device 122, or multiple administrative persons 118 and 120. In this way, an image of interest 302 contains image segments comprising the target/plant 304 and at least one artifact 306, and may be associated with an issue record 308 enabling the workflow server 116 to trigger notifications about the issue 308.

Issue Identification and Remediation Course of Action Dispatching

Figure 4:
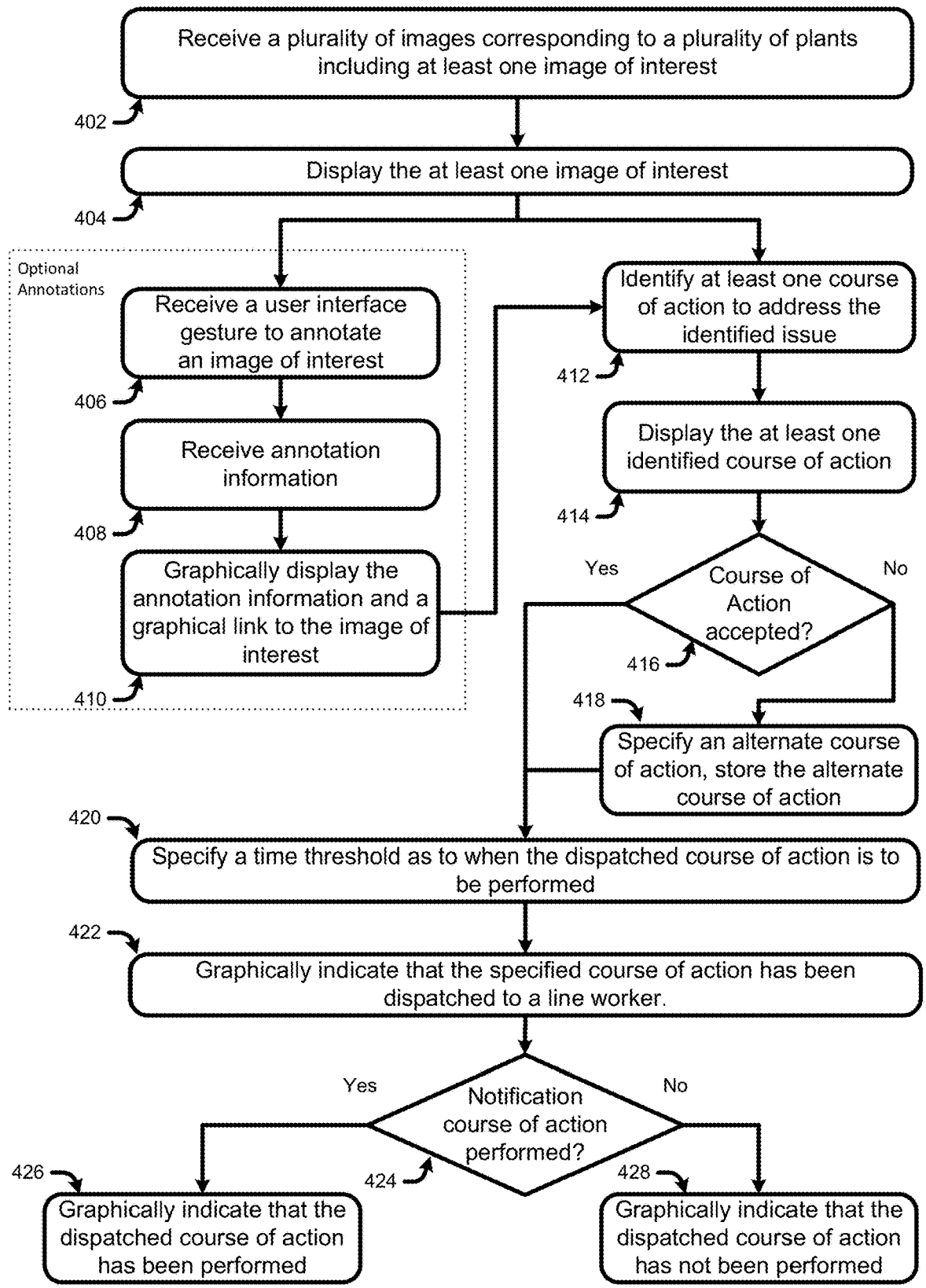
FIG. 4 is a flow chart of an exemplary issue identification and dispatching process for horticultural care tracking, validation and verification.

In a horticultural feedback loop, issues may be identified from many sources including line workers 124, the workflow server 116 and its automation, and administrative personnel 118 and 120. Suggested remediation courses of action may also come from many sources. However, the decision whether to execute on a remediation course of action generally is done by an administrative person 118 and 120. This process may be done from a dispatching device 122. FIG. 4 is a flow chart 400 of an exemplary process to identify issues and dispatch remediation courses of action.

In block 402, a dispatching device 122 receives a plurality of images of interest. Per the discussion with respect to FIG. 3, an image of interest 302 in a horticultural feedback loop includes a plant 304 and an artifact of the plant 306. An image of interest 302 may be associated with an issue record 308 as well.

In block 404, the dispatching device 122 may display at least one of the received images. The dispatching device 122 may select an image to display based on a ranking of issues associated with the received images. Images 302 that are associated with issue records 308 may be ranked by severity of issue. Ranking issue records by priority and/or severity is described with respect to FIG. 3. In some cases, a user may browse through multiple images prior to selection, or may look at images in sequence. Various user interface patterns in reviewing multiple images is described in further detail with respect to FIG. 6.

Alternatively, the dispatching device 122 may select an image to display based on an ordering by time or other grouping or an image to be displayed may be selected from a user query.

A user may desire to add information to an image. Such information is called an annotation. Annotations may simply be markers such as "pin drop" where a marker is placed on an image to enable finding the image again quickly. Other annotations may be graphical marks on the image, such as circling artifacts or adding notes. Yet other annotations may be text commentary. Annotation data may be stored as associated with an image or with an issue. This association is described with respect to FIG. 3.

Annotations are optional, but in block 406, the user may indicate a desire to add an annotation by making a user interface gesture to select an image. User interface gestures are acts that trigger events in software to indicate input. For a tablet computer, a tap on the image constitutes one possible user interface gesture. For a laptop with a graphical user interface, a mouse click on an image may constitute a possible user interface gesture.

Once an image is selected with a user interface gesture, a user may enter the annotation information 408. Generally, as per block 410, the annotation information is displayed either while the annotation information is entered, or soon thereafter. At this point the annotation information is associated and stored with the relevant issue and/or image.

Displayed images may also display issues associated with the image. In block 412, an issue that has been identified, and is associated with the image may be displayed. The workflow server 116 stores remediation courses of action for issues. A remediation course of action may comprise one or more tasks. For a particular issue record 308 associated with an image 302, the workflow server 116 may be queried for the associated remediation courses of action. The association of remediation courses of action to issues is described with respect to FIG. 3. One, some, or all remediation courses of action, or their constituent tasks, may then be retrieved and displayed on the dispatching device 122.

At this point, an image with a plant has been selected, where the image is displayed along with a present issue under consideration. In block 416, the user may then make a user interface gesture to either select a remediation course of action associated with the present issue or in block 418 may specify an alternative course of action. Where an alternative course of action is specified, the alternative may be stored with the working server, and associated with the present issue. In this way, the alternative may be provided for images with the same issue. Over time, an administrator may update the list of remediation courses of action as stored in the workflow server 116.

Now by virtue of selecting an image, a plant and a present issue have been selected and a remediation course of action has been specified. The dispatching device 122 will use the dispatching software component 252 to dispatch the specified remediation course of action. To do so, the user may specify a deadline. Specifically, in block 420, by specifying a time threshold to the dispatching software component 252 for when the remediation course of action is to be performed. One a deadline is specified, the user may make a user interface gesture for the dispatching software component 252 to dispatch the remediation course of action to the workflow server 116. The workflow server 116 will then identify candidate line workers 124 associated with the selected plant in the selected image and with matching qualifications to perform the dispatched remediation course of action. Where there are multiple candidate line workers 124 to perform the remediation course of action, the workflow server will schedule the remediation course of action to the first available worker. In block 422, once the workflow server 116 dispatches the remediation course of action, the dispatching device 122 may graphically indicate a successful dispatch.

As time passes, line workers 124 will perform tasks and send notifications as to whether the work has been performed. The workflow server 116 will forward those notifications to the status receiver software component 254 in the dispatching device 122. The status receiver software component is a notifications subscriber. Whenever a remediation course of action is dispatched, by the dispatching software component 252, the status receiver software component 254 notifies the workflow server 116 that it is to subscribe to all notifications associated with that dispatch.

As time passes, the workflow server 116 then sends notifications back to the status receiver software component 254. Some notifications are that the task was completed. Other notifications are that the task in progress but there was a complication. If, per block 424, such a notification arrives, per block 426 the dispatching device 122 will graphically indicate that the dispatched course of action was performed. This may be by removing the dispatched course of action from a list, adding a checked mark icon to the course of action, or some other graphical indicia.

Dispatched courses of action are associated with deadlines. As time passes, when the specified time arrives, per block 428, any courses of action not performed may be reported to a user. In this way, the user may follow-up if needed.

Accordingly, the workflow server 116 provide images to a dispatching device 122, and display at least one image. The user may select an image, and with it a plant and an associated issue. The associated issue may be used to retrieve remedial courses of action from the workflow server 116. The user may then select a remedial course of action or specify an alternative for dispatch. The course of action is dispatched via a dispatcher software component 252, and notifications about the dispatch are received with a status receiver software component 254, thereby completing the horticultural feedback loop.

Collaboration

Large scale horticultural operations may be spread over geographically distant greenhouses 104. Growers 120 and master growers 118 may be geographically separated. The dispatching devices 122 are configured to facilitate remote collaboration.

Collaboration may have a communications mode, which is the type of communication. Common communications modes are voice, video and text.

Collaboration may be in different degrees. A full screen may be shared or only part of a screen may be shared. Collaboration may be asymmetric where only one user has control or symmetric where both users have equal control. This generally is implemented by sharing privileges on the two collaborating dispatching devices 122 as described below.

Figure 5:
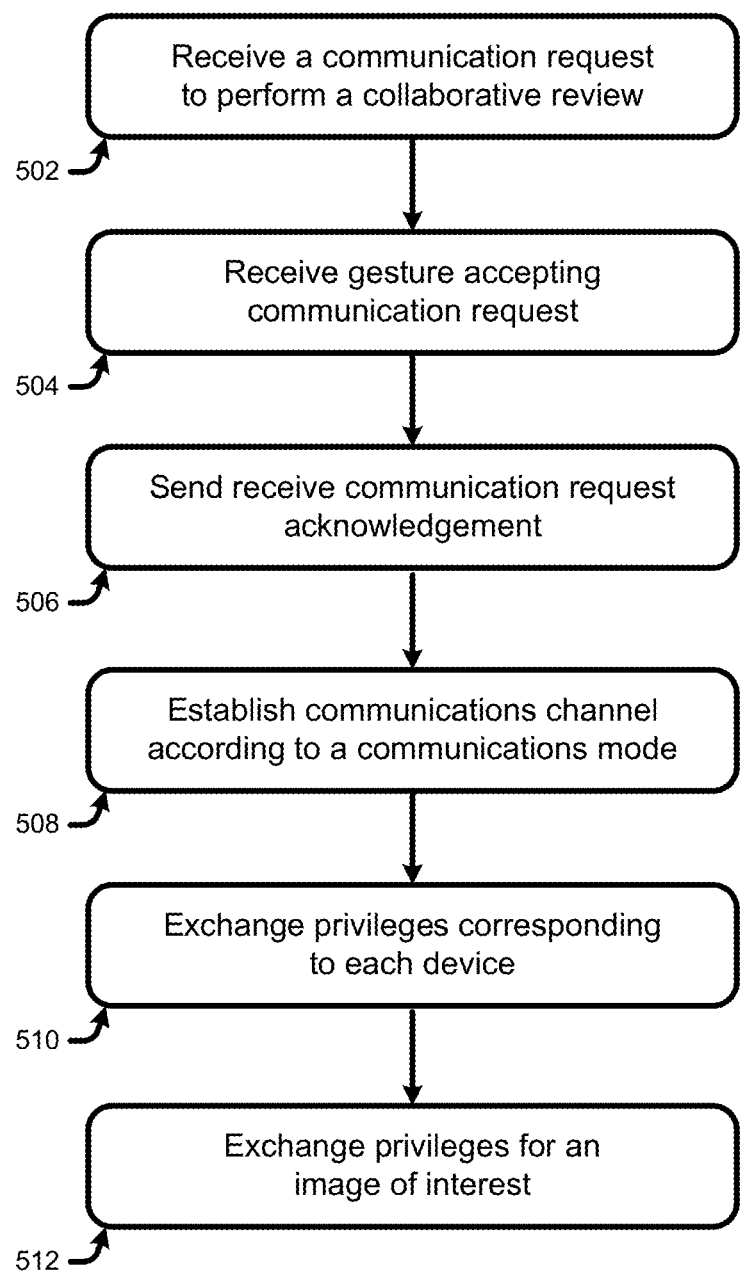
FIG. 5 is a flow chart of an exemplary collaborative process for horticultural care tracking.

FIG. 5, is a flow chart 500 of an example initiation of a collaboration session.

In block 502, a dispatching device 122 receives a notification for a request to communicate. The notification contains the identity of the requestor and potentially the network address of the requestor's dispatching device 122. The notification will also indicate the mode of communications such as video conference, voice, screen sharing as enumerated above.

In block 504, the receiving user may make a user interface gesture on his or her dispatching device 122 to accept the communications request. Alternatively the user may cancel or dismiss the request. If the communications request is communicated, the mode of communications is established. In either case, in block 506, the communications request reply is sent.

If the communications request is accepted, the dispatching device 122 performs a communications channel handshake with a communications server, either in the workflow server 116 or connected to the workflow server 116. In this way, per block 508, a communications channel is established. The communications server matches the mode of communication e.g. voice, video, or text.

Once the communications channel and a communications mode are established, collaboration privileges are exchanged in block 510. Privileges for a display may be set to not be shared, to be partially shared, or to be completely shared. Privileges for input may be to allow the other user to control the screen, and to enter annotations. Where privileges for both users are the same, the privileges exchanged are symmetric. Otherwise, the privileges are asymmetric.

For horticultural feedback, privileges may be assigned to a shared image of interest. The privileges set may be to annotate the image, to associate an image with an issue, and to dispatch a remedial course of action. Privileges specific to an image of interest are exchanged in block 512.

After the communications channel for the selected communications mode is established, and privileges are exchanged, the collaboration communications may proceed.

User Interface Patterns for Displaying Multiple Images

When the workflow server 116 sends images to a dispatching device 122 a user may desire to review multiple images in sequence. There are various user interface patterns involving multiple images. FIG. 6 is a flow chart 600 of some exemplary patterns.

In block 602, the dispatching device 122 receives several images of interest from the workflow server 116. The images are associated with a date time stamp, usually embedded in the image's file format or metadata. The dispatching device 122 may take at least two of the images, a first image with a first date time stamp and a second image with a second date time stamp. One of the images will usually, but not always be an image captured later in time than the other.

The dispatching device 122 may support multiple patterns to display the two images. One may be to show the images side by side. Another is to overlay the images and highlight differences. In block 604, the user selects, via a user interface gesture, which user interface pattern for the dispatching device to use.

By way of example, one pattern is to display one image and use a toggle to display the second image. In block 606, the user interface gesture is interpreted by the display device 122 as a request to toggle images. Accordingly, in block 608, the display device 122 will display the second image responsive to the toggle request.

By way of another example, in block 610, the user interface gesture is interpreted to display multiple images in the context of a chart over time. Specifically, a chart shows telemetry over time. Telemetry may include vapor pressure deficit, daily light integral and relative photosynthesis index. As the user selects a spot on the chart, per block 612, an image that most closely corresponds to the time of that spot is selected, and per block 608 is displayed. Telemetry values for that time may also be displayed. In this way, the image of the plant being measured by the telemetry is displayed along with the telemetry.

In general, different user interface patterns are supported by the dispatching device 122 to enable users to review multiple images.

Line Worker Device Horticultural Care Tracking

Figure 7:
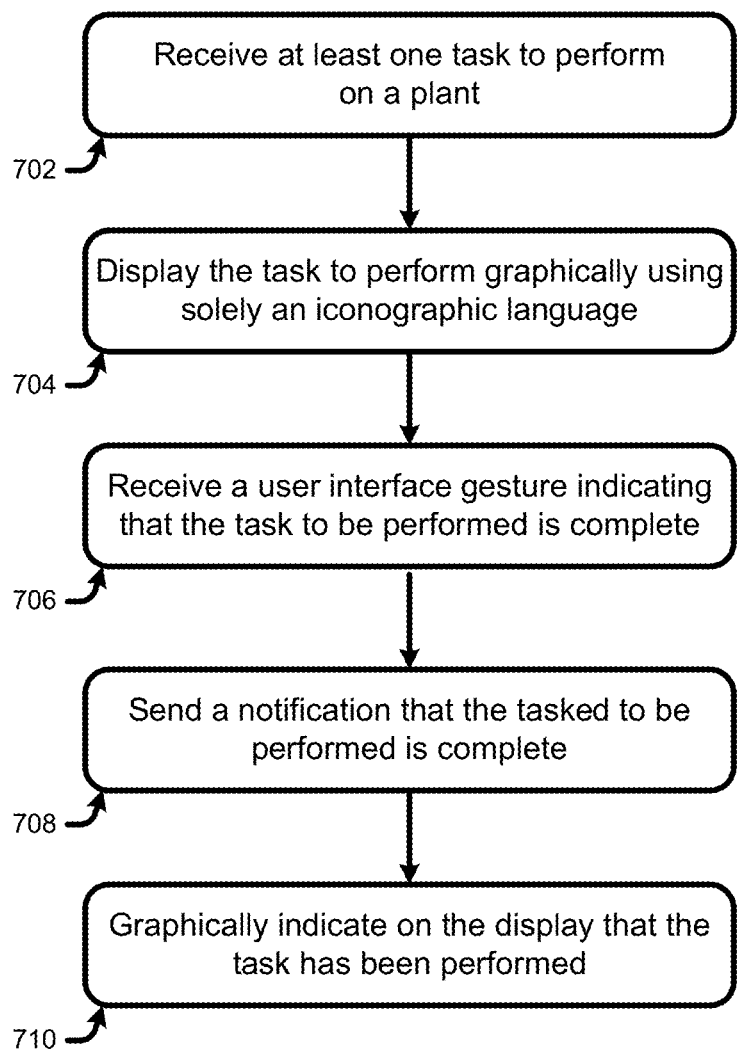
FIG. 7 is a flow chart of an exemplary client side task management process for horticultural care tracking.

Thus far the description of the horticultural care feedback loop has been about the dispatching of remedial courses of action. Courses of action are dispatched by the workflow server 116 to line workers 124 via their line worker devices 126. FIG. 7 is a flow chart 700 of the operations from the perspective of the line work 124 and the line worker device 126.

As described with respect to FIG. 4, remedial courses of action may comprise multiple tasks. When a course of action is dispatched from a dispatching device 122, the course of action is sent to the workflow server 116. The workflow server 116 retrieves the tasks comprising the course of action. Those tasks are to be scheduled to at least one line worker 124. The workflow server 116 identifies line workers 124 are working on the plant associated with the course of action, and have the capabilities to perform the task. Where there are multiple candidate line workers 124, the workflow server 116 load balances work by giving the task to the first available line worker 124, or to the line worker 124 with the smallest workload. Where there are no qualified line workers, the workflow server 116 will send a notification to the dispatching device 122 that initiated the course of action.

When a task is dispatched to a line worker 124, in block 702 the line worker's device 126 receives the task with the task receiver software component 272. The task receiver software component 272 then sorts the tasks by priority and per block 704 displays the queued tasks.

Often, line workers 124 have widely varying primary languages and educational skills. Accordingly, in block 704, the displayed queued tasks are shown via icons. An icon is a graphical representation or symbol. Here the icons displayed are symbols of known tasks, such as watering, pruning, increasing light, and harvesting. The set of icons, or symbols to indicate the various tasks is called an iconographic language. The iconographic language may include numbers and/or values. For example, an icon to water may be accompanied by an indication of the amount of water to use. However, because the tasks do not rely on a primary language, the iconographic language may provide a *lingua franca* between the administrative personnel 118 and 120 and the line workers 124.

The line workers 124 will then perform the queued tasks. As those tasks are completed, the line workers 124 may make a user interface gesture per block 706 to indicate that the task was performed. Upon receiving the gesture, the line worker device 126 will send a notification via the notifier software component 274 to the workflow server 116 that the task was performed. Generally the notification will include a date time stamp indicating when the task was reported as complete. This information will later be used during verification and validation as described with respect to FIG. 8.

Since the dispatching device 122 that dispatched the task enlisted in notifications relating to the course of action at time of dispatch, the dispatching device 122 may receive the notification that the task was complete.

In the meantime, per block 710, the line worker device 126 will graphically indicate that the task was performed. This may be by removing the task, changing the color, or adding a completeness icon such as a check box.

In some cases, the line worker 124 may be prevented from completing the task. In this event, the line worker may select an icon that corresponds to common impediments to completing a task. Examples may include insufficient fertilizer, power outage and the like. As with receiving tasks, the status indicators use solely an iconographic language. Upon receiving a user gesture selecting the icon, the line worker device 126 dispatches a notification corresponding to the selected icon via the notifier software component 274.

Some line workers 124 may desire to send a more complete explanation beyond the limitations of an iconographic language. In these circumstances, the line worker 124 may supplement the notification with text and/or media images via the annotation software component 274. The annotation software component provides a user interface to enter text messages and/or attach multimedia files, such as images. Annotations may be sent as part of notifications or may be sent separately. Where an annotation is sent without a notification, a generic notification will be generated by the workflow server 116 so that the dispatching device 122 may be notified of the annotation, and may receive the annotation.

Horticultural Reporting, Validation and Verification

Figure 8:
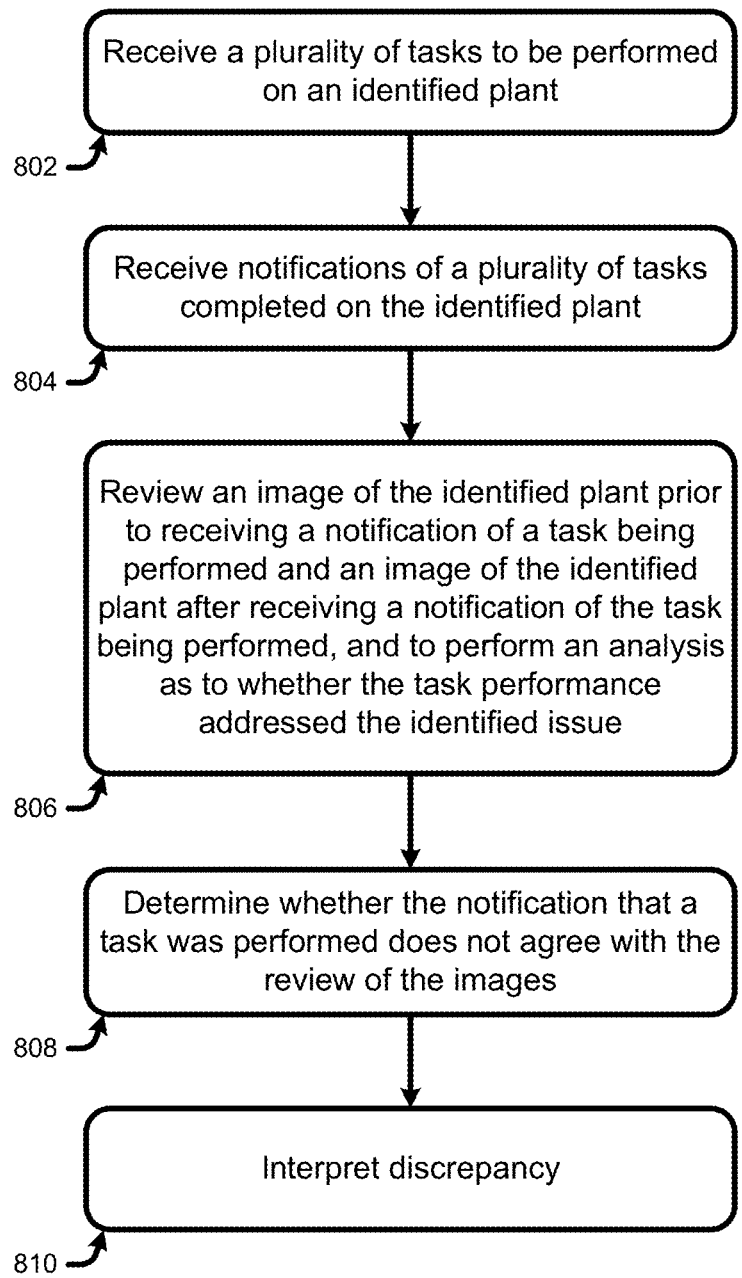
FIG. 8 is a flow chart of an exemplary validation and verification process for horticultural care tracking.

Returning to the perspective of the administrative personnel 118 and 120, the dispatching device 122 has subscribed to notifications relating to any dispatched remedial courses of action. Specifically the status receiver software component 254 subscribes to notifications. So when a line worker device 126 indicates that a task is complete, the workflow server 116 routes the notification to the dispatching device 122. However, having a task reported as performed is not the same as the task having been performed properly or completely. Accordingly, the dispatch device 122 supports validation and verification of tasks. FIG. 8 is a flow chart 800 of an exemplary process to do so.

In block 802, a dispatching device 122 receives a plurality of tasks to be performed for a particular plant. Generally this occurs when a user has the dispatching device 122 query the workflow server for all pending tasks for a specified plant. However, tasks may be queried from other criteria, such as by remedial course of action, by line worker, by grow operation and the like. In block 804, the workflow server 116 also provides the most recent notifications relating to those tasks.

To verify that a task was done or done properly, a user may have the dispatching device 122 request an image of the subject plant just before the task was reported as done and a second image of the subject plant just after the task was reported as done. In block 806, the images may be reviewed, for example via the patterns as described with respect to FIG. 6, and a user may determine whether the task was done properly, or if the task and/or remedial course of action was affected. With this information, a user may modify remedial courses of action, and may corrections if needed.

Block 806 need not be manual. For large horticultural operations, it is not practical for administrative personnel 118 and 120 to manually review all tasks. Accordingly, in block 806, a workflow server 116 may work with an image processing server 114 to compare the image prior to the task and the image after the task. If there are no noticeable differences, then either the task was not performed correctly, or was not performed at all. Alternatively, if the plants continue to display artifacts with issues, then the task was not performed or was not effective. In general trend analysis and sequential analysis may be used to determine the efficacy of dispatched tasks and/or courses of action. Sequential analysis is described in co-pending application Ser. No. 15/271,569, entitled "Hi Fidelity Computer Object Recognition Based Horticultural Feedback Loop," and is herein incorporated by reference.

In some cases, the user may detect fraudulent reporting. In extreme cases, there may be indications of theft. To detect these scenarios, in block 808, the workflow server 116 in conjunction work with the image processing server 114 may determine that the images do not agree with what was reported by the line workers 125. For example, the image processing server 114 may determine that the plant is no longer in the image, even though the plant is reported as healthy and in place. The workflow server 116 may then search other images for the plant, and if not found, in block 810 interpret the images as a stolen plant. In this circumstance, a notification of a stolen plant may be sent by the workflow server to the dispatching device 122.

Accordingly, the workflow server 116 has collected notifications about tasks and remedial courses of action. Not only are notifications provided to administrative personnel 118 and 120, the workflow server 116 in conjunction with the image processing server 114 may compare images proximate in time to tasks being performed, and may interpret the images for efficacy, proper performance of tasks, or in extreme cases theft. In this way, administrative personnel 118 and 120 may focus on the most impactful notifications in the horticultural feedback loop.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. One or more non-transitory computer-readable media storing computer-executable instructions that upon execution cause one or more processors to perform acts comprising:
   receiving a plurality of images corresponding to a plurality of plants respectively, wherein the images of the received plurality of images comprise depictions of an identified plant and an identified artifact;
   associating one or more image of the plurality of images with at least one issue record based at least on an analysis of the identified artifact;
   attributing a level of severity to the at least one issue record;
   generating a ranked set of issue records comprising the at least one issue record for the one or more image of the plurality of images, wherein issue records in the ranked set of issue records are ranked according to the respective attributed level of severity;
   selecting, from the plurality of images based on a position within the ranked set of issue records, an image of interest; and
   displaying the image of interest along with an indication of the associated issue record.

2. The one or more non-transitory computer-readable media of claim 1, wherein the acts further comprise:
   receiving a user interface gesture to modify the displaying of the image of interest; and
   displaying an additional image of interest responsive to the receiving of the user interface gesture.

3. The one or more non-transitory computer-readable media of claim 2, wherein the received user interface gesture is a selection of time, and wherein the additional image of interest corresponds to an image of the plurality of images captured at the selected time.

4. The one or more non-transitory computer-readable media of claim 1, wherein the acts further comprise:
   receiving a notification indicating an additional identified issue record associated with the image of interest, wherein the notification comprises a message; and
   displaying the message via a user interface.

5. The one or more non-transitory computer-readable media of claim 1, wherein the acts further comprise:
   receiving annotations associated with the image of interest; and
   displaying the image of interest with the annotations.

6. The one or more non-transitory computer-readable media of claim 1, wherein the displaying of the image of interest is based at least on one or more privileges associated with the image of interest.

7. The one or more non-transitory computer-readable media of claim 1, wherein the acts further comprise:
   receiving telemetry data corresponding to the image of interest; and
   displaying a chart representing the telemetry data over a time period.

8. The one or more non-transitory computer-readable media of claim 7, wherein the telemetry data is based at least on information received in relation to the image of interest.

9. The one or more non-transitory computer-readable media of claim 7, wherein the acts further comprise:
   displaying a report based at least on the telemetry data over the time period.

10. A computer-implemented method, comprising:
    receiving a plurality of images corresponding to a plurality of plants respectively, wherein the images of the received plurality of images comprise depictions of an identified plant and an identified artifact;
    associating one or more image of the plurality of images with at least one issue record based at least on an analysis of the identified artifact;
    attributing a level of severity to the at least one issue record;
    generating a ranked set of issue records comprising the at least one issue record for the one or more image of the plurality of images, wherein issue records in the ranked set of issue records are ranked according to the respective attributed level of severity;
    selecting, from the plurality of images based on a position within the ranked set of issue records, an image of interest; and
    displaying the image of interest along with an indication of the associated issue record.

11. The computer-implemented method of claim 10, further comprising:
    receiving a user interface gesture to modify the displaying of the image of interest; and
    displaying an additional image of interest responsive to the receiving of the user interface gesture.

12. The computer-implemented method of claim 10, wherein the image of interest is at least partially highlighted.

13. The computer-implemented method of claim 10, wherein the image of interest is annotated.

14. The computer-implemented method of claim 10, further comprising:
    receiving a user interface gesture to modify the displaying of the image of interest; and
    displaying the image of interest and an additional image of interest responsive to the receiving of the user interface gesture.

15. The computer-implemented method of claim 14, wherein the image of interest corresponds to a first date time stamp and the additional image of interest corresponds to a second date time stamp.

16. A system, comprising:
    one or more non-transitory storage mediums configured to provide stored computer-readable instructions; and one or more processors coupled to the one or more non-transitory storage mediums, the one or more processors configured to execute the computer-readable instructions to cause the one or more processors to:

receive a plurality of images corresponding to a plurality of plants respectively, wherein the images of the received plurality of images comprise depictions of an identified plant and an identified artifact;

associate one or more image of the plurality of images with at least one issue record based at least on an analysis of the identified artifact;

attribute a level of severity to the at least one issue record;

generate a ranked set of issue records comprising the at least one issue record for the one or more image of the plurality of images, wherein issue records in the ranked set of issue records are ranked according to the respective attributed level of severity;

select, from the plurality of images based on a position within the ranked set of issue records, an image of interest; and display the image of interest along with an indication of the associated issue record.

17. The system of claim 16, wherein the one or more processors are configured to:

receive a user interface gesture to modify the displaying of the image of interest; and display the image of interest corresponding to a first date time stamp and an additional image of interest corresponding to a second date time stamp responsive to the receiving of the user interface gesture.

18. The system of claim 16, wherein the one or more processors are configured to:

perform object recognition analysis on the plurality of images; and detect at least one issue for the identified plant corresponding to the identified artifact based at least on the object recognition analysis, wherein the at least one issue record is associated with the one or more image based on the detected at least one issue.

19. The system of claim 18, wherein the object recognition analysis comprises a static analysis.

20. The system of claim 18, wherein the object recognition analysis comprises a sequential analysis.

* * * * *